(12) United States Patent
Lu et al.

(10) Patent No.: US 8,358,693 B2
(45) Date of Patent: Jan. 22, 2013

(54) ENCODING VISUAL DATA WITH COMPUTATION SCHEDULING AND ALLOCATION

(75) Inventors: Yan Lu, Beijing (CN); Feng Wu, Beijing (CN); Wei Pu, Anhui (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1554 days.

(21) Appl. No.: 11/457,705

(22) Filed: Jul. 14, 2006

(65) Prior Publication Data

US 2008/0013628 A1 Jan. 17, 2008

(51) Int. Cl.
*H04N 7/12* (2006.01)
*H04N 11/02* (2006.01)

(52) U.S. Cl. .............. 375/240.07; 375/240.24
(58) Field of Classification Search ......... 375/240.02–7, 375/240.24
See application file for complete search history.

(56) References Cited

U.S. PATENT DOCUMENTS

| | | | |
|---|---|---|---|
| 5,144,423 A | 9/1992 | Knauer et al. | |
| 5,412,741 A | 5/1995 | Shapiro | |
| 5,719,632 A | 2/1998 | Hoang et al. | |
| 5,818,536 A | 10/1998 | Morris et al. | |
| 5,854,658 A * | 12/1998 | Uz et al. | 375/240.05 |
| 5,862,450 A | 1/1999 | Mandal et al. | |
| 6,018,303 A | 1/2000 | Sadeh | |
| 6,122,320 A | 9/2000 | Bellifemine et al. | |
| 6,157,746 A | 12/2000 | Sodagar et al. | |
| 6,275,532 B1 | 8/2001 | Hibi et al. | |
| 6,289,049 B1 | 9/2001 | Kim et al. | |
| 6,498,810 B1 | 12/2002 | Kim et al. | |
| 6,526,097 B1 | 2/2003 | Sethuraman et al. | |
| 6,542,549 B1 | 4/2003 | Tan et al. | |
| 6,628,712 B1 | 9/2003 | Le Maguet | |
| 6,717,990 B1 | 4/2004 | Abousleman | |
| 6,735,249 B1 | 5/2004 | Karczewicz et al. | |

(Continued)

FOREIGN PATENT DOCUMENTS

EP 0971542 1/2000

(Continued)

OTHER PUBLICATIONS

Aaron et al., "Compression with Side Information Using Turbo Codes", Proc. of Data Compression Conf (DCC 02), Apr. 2002, Utah, 10 pgs.

(Continued)

*Primary Examiner* — Jay Au Patel
*Assistant Examiner* — Richard Torrente
(74) *Attorney, Agent, or Firm* — Lee & Hayes, PLLC

(57) ABSTRACT

Computation scheduling and allocation for visual communication is described. In one aspect, multiple frames of video data are encoded by allocating for at least a subset of inter-coded frames, on frame-by-frame basis, computational resources to encode the inter-coded frame. To this end, a computational budget to encode a current inter-coded frame is estimated. The estimate is based on the actual computational costs to encode a previous inter-coded frame of video data. Next, sets of operations associated with encoding the current inter-coded frame are analyzed to determine computational resources to implement the operations. If the computational resources exceed the computational budget, complexity of the operations is reduced until the associated computational resources are less than or equal to the computational budget. At this point, the current inter-coded frame is encoded using the operations and the computational budget. This process is repeated for the remaining inter-coded frames of video data.

17 Claims, 5 Drawing Sheets

U.S. PATENT DOCUMENTS

| | | | |
|---|---|---|---|
| 6,920,175 B2 | 7/2005 | Karczewicz et al. | |
| 6,947,486 B2 | 9/2005 | Akhan et al. | |
| 7,003,035 B2 | 2/2006 | Tourapis et al. | |
| 7,031,389 B2 | 4/2006 | Guevorkian et al. | |
| 7,233,269 B1 | 6/2007 | Chen et al. | |
| 7,256,716 B2 | 8/2007 | Liu et al. | |
| 7,418,037 B1 * | 8/2008 | Nie et al. | 375/240.03 |
| 2003/0123540 A1 * | 7/2003 | Zhong et al. | 375/240.07 |
| 2003/0151753 A1 | 8/2003 | Li et al. | |
| 2003/0156644 A1 | 8/2003 | Song et al. | |
| 2004/0039571 A1 | 2/2004 | Bruekers et al. | |
| 2004/0114684 A1 | 6/2004 | Karczewicz et al. | |
| 2004/0172478 A1 | 9/2004 | Jacobs et al. | |
| 2005/0013371 A1 | 1/2005 | Yim et al. | |
| 2005/0024487 A1 | 2/2005 | Chen | |
| 2005/0036550 A1 | 2/2005 | Koba et al. | |
| 2005/0047508 A1 | 3/2005 | Ha et al. | |
| 2005/0084014 A1 | 4/2005 | Wang et al. | |
| 2005/0105815 A1 | 5/2005 | Zhang et al. | |
| 2005/0201468 A1 | 9/2005 | Tsai et al. | |
| 2005/0232360 A1 | 10/2005 | Byun | |
| 2005/0268200 A1 | 12/2005 | Garudadri et al. | |
| 2006/0008006 A1 | 1/2006 | Cha et al. | |
| 2006/0062299 A1 | 3/2006 | Park et al. | |
| 2006/0072662 A1 | 4/2006 | Tourapis et al. | |
| 2006/0197686 A1 | 9/2006 | Liu et al. | |
| 2006/0197690 A1 | 9/2006 | Liu et al. | |
| 2006/0200733 A1 | 9/2006 | Stankovic et al. | |
| 2007/0013561 A1 | 1/2007 | Xu et al. | |
| 2007/0014356 A1 | 1/2007 | Han et al. | |
| 2007/0041652 A1 | 2/2007 | Budge et al. | |
| 2007/0133690 A1 * | 6/2007 | Xin et al. | 375/240.24 |
| 2007/0165717 A1 | 7/2007 | Ye | |
| 2007/0217541 A1 | 9/2007 | Liu et al. | |
| 2008/0189073 A1 | 8/2008 | Jagmohan et al. | |
| 2008/0219351 A1 | 9/2008 | Kim et al. | |

FOREIGN PATENT DOCUMENTS

| | | |
|---|---|---|
| WO | WO2005043882 A2 | 5/2005 |

OTHER PUBLICATIONS

Aaron, et al., "Towards Practical Wyner-Ziv Coding of Video", vol. 3, IEEE, Sep. 14-17, 2003, pp. 869-872.

Aaron, et al., "Transform-domain Wyner-Ziv Codec for Video", available at least as early as Jun. 4, 2007, at <<http://citeseer.ist.psu.edu/cache/papers/cs/31531/http:zSzzSzwww.stanford.eduzSz~bgirodzSzpdfszSzAaronVCIP04.pdf/transform-domain-wyner-ziv.pdf>>, 9 pgs.

Aaron et al., "Wyner-Ziv Coding of Motion Video", Proc. Asilomar Conf on Signals and Systems, California, Nov. 2002, 5 pgs.

Aaron, et al., "Wyner-Ziv Video Coding with Hash-Based Motion Compensation at the Receiver", International Conference on Image Processing (CIP), 2004, pp. 3097-3100.

Adikari, et al., "Side Information Improvement in DVC with Two Side Information Streams and 3D Motion Refinement," retrieved at <<http://ieeexplore.ieee.org/iel5/4232658/4232659/04232674.pdf?isnumber=4232659&prod=CNF&arnumber=4232674&arSt=32&ared=35&arAuthor=Adikari%2C+A.+B.+B.%3B+Fernando%2C+W.+A.+C.%3B+Weerakkody%2C+W.+A.+R.+J.&htry=1>>, IEEE, 2007, pp. 32-35.

Barron, et al., "The Duality Between Information Embedding and Source Coding with Side Information and Some Applications", available at least as early as Jun. 4, 2007, retrieved at <<http://allegro.mit.edu/pubs/posted/journal/2003-barron-chen-wornell-it.pdf>>, IEEE Transactions on Information Theory, vol. 49, No. 5, May 2003, pp. 1159-1180.

Berrou, et al., "Near Shannon Limit Error-Correcting Coding and Decoding:Turbo-Codes (1)", Proc. IEEE International Conference on Communications, Geneva, Switzerland, May 1993, pp. 1064-1070.

Chen et al., "Fast Integer Pel and Fractional Pel Motion Estimation for JVT", JVT-FO17, 6th Mtg, Japan, Dec. 2002, 14 pgs.

Chen et al, "Rate Control for Streaming Video over Wireless", Proc. INFOCOM 2004, Hong Kong, China, Mar. 2004, 6 pgs.

Dalai, et al., "Improving Turbo Codec Integration in Pixel-Domain Distributed Video Coding," available at least as early as Nov. 5, 2007, at <<http://www.discoverdvc.org/publications/IST/DLP_ICASSP06.pdf>>, 4 pgs.

Divsalar, et al., "Multiple Trellis Coded Modulation (MTCM)," IEEE Transactions on Communications, vol. 36, No. 4, Apr. 1988, pp. 410-419.

Fowler, et al., "Wavelet-Based Distributed Source Coding of Video", Proc. of European Signal Processing Conf, Turkey, 2005, 4 pgs.

Girod, et al., "Distributed Video Coding", IEEE, Special Issue on Advances in Video Coding and Delivery, vol. 93, Issue 1, Jan. 2005, pp. 1-12.

Guo et al., "Dependency Modeling in Multiple Bit-Rate Video Streaming Using Wyner-Ziv Coding", ICIP, 2006, 5 pgs.

Guo et al, "Free Viewpoint Switching in Multi-View Video Streaming Using Wyner-Ziv Video Coding", SPIE Visual Communications and Image Processing, Jan. 2006, 8 pgs.

He et al., "Power-Rate-Distortion Analysis for Wireless Video Communication under Energy Constraints", IEEE Trans. on Circuits and Systems for Video Technology, vol. 15, May 2005, 13 pgs.

Karczewicz et al., "The SP- and SI-Frames Design for H.264/AVC", IEEE Trans. on Circuits and Systems for Video Technology, vol. 13, No. 7, Jul. 2003, 8 pgs.

Liu, et al., "Wyner-Ziv Video Coding Using LDPC Codes", IEEE, 2006, pp. 258-261.

Martucci et al., "Zerotree Entropy Coding of Wavelet Coefficients for Very Low Bit Rate Video", ICIP 1996, Swizerland, Sep. 1996, 4 pgs.

Pradhan et al., "Distributed Source Coding Using Syndromes (DISCUS): Design and Construction", IEEE Trans. on Information Theory, vol. 49, No. 3, Mar. 2003, 18 pgs.

Pu et al., "Joint Power-Distortion Optimization on Devices with MPEG-4 AVC/H.264 Codec", Proc. ICC 2006, Turkey, Jun. 2006, 6 pgs.

Puri et al., "PRISM: A New Robust Video Coding Architecture Based on Distributed Compression Principles", Proc. 40th Allerton Conf on Communication, Control, and Computing, Illinois, Oct. 2002, 10 pgs.

Puri et al., "PRISM: A Reversed Multimedia Coding Paradigm", IEEE Int. Conf. Image Processing, Spain, 2003, 4 pgs.

Rowitch et al., "On the Performance of Hybrid FEC/ARQ Systems Using Rate Compatible Punctured Turbo (RCPT) Codes", IEEE Trans. on Communications, vol. 48, No. 6, Jun. 2000, 12 pgs.

Slepian, et al., "Noiseless Coding of Correlated Information Sources", IEEE Transactions on Information Theory, vol. IT-19, No. 4, Jul. 1973, pp. 471-480.

"Source Coding", http://www.irisa.fr/temics/research/coding.php, printed on Apr. 25, 2006, 6 pages.

Sun et al., "The Improved SP Frame Coding Technique for the JVT Standard", Proc. IEEE ICIP 2003, vol. 3, Spain, Sep. 2003, 4 pgs.

Westerlaken, et al., "Turbo-Code Based Wyner-Ziv Video Compression", available at least as early as Jun. 4, 2007, at <<http://ict.ewi.tudelft.nl/pub/ronald/RPWesterlakenWic2005.pdf>>, 8 pgs.

Wiegand et al., "Overview of the H.264/AVC Video Coding Standard", IEEE Trans. on Circuits and Systems for Video Technology, vol. 13, No. 7, Jul. 2003, 19 pgs.

Wu, et al., "Multiple Description Image Coding with Distributed Source Coding and Side Information", SPIE Multimedia Systems and Applications VII, Mitsubishi Electric Research Laboratories, Inc., Dec. 2004, 10 pages.

Wyner, et al., "The Rate-Distortion Function for Source Coding with Side Information at the Decoder", IEEE Transactions on Information Theory, vol. IT-22, No. 1, Jan. 1976, pp. 1-10.

Yang et al., "A Framework for Fine-Granular Computational-Compleity Scalable Motion Estimation", Proc. IEEE, ISCAS 2005, vol. 6, May 2005, 4 pgs.

Yang, et al., "Wyner-Ziv Coding Based on TCQ and LDPC Codes", IEEE, 2003, pp. 825-829.

Zamir, et al., "Nested Linear/Lattice Codes for Structured Multiterminal Binning", IEEE Transactions on Information Theory, vol. 48, No. 6, Jun. 2002, pp. 1250-1276.

Vleeschouwer, et al., "Motion Estimation for Low Power Video Devices", IEEE, 2001, pp. 953-956.

Zhao, et al., "Complexity Management for Video Encoders", 3 pages.

Zhao, et al., "Computational Complexity Management of Motion Estimation in Video Encoders", Proceedings of the Data Compression Conference, IEEE, 2002, 1 page.

Adikari, et all, "A Sequential Motion Compensation Refinement Technique for Distributed Video Coding of Wyner-Ziv Frames", Image Processing, 2006 IEEE International Conference: iEEE Cot. 2006, pp. 597-600.

Akikari, et al., "Wyner-Ziv Coding with Temporal and Spatial Correlations for Motion Video", Electrical and Computer Engineering, 2006, CCECE 2006, IEEE May 2006, pp. 1188-1191.

Artigas, et al., "A Model-Based Enhanced Approach to Distributed Video Coding", Image Analysis for Multimedia Interactive Services, WIAMIS, Apr. 13-15, 2005, 4 pgs.

Sun et al., "Efficient and Flexible Drift-Free Video Bitstream Switching at Predictive Frames" retrieved from http://research.microsoft.com/~fengwu/papers/switching_icme_02.pdf, Proc IEEE Intl Conf on Multimedia and Expo, Aug. 2002, 4 pages.

Sun et al., "Seamless Switching of Scalable Video Bitstreams for Efficient Streaming" retrieved from http://research.microsoft.com/~fengwu/papers/switch_mm_04.pdf, IEEE Transactions on Multimedia, special issue on Video Streaming, Apr. 2004, vol. 6, No. 2, 13 pages.

Wang, et al., "WZS: Wyner-Ziv Scalable Predictive Video Coding" retrieved from http://www.ece.ucdavis.edu/PCS2004/pdf/ID110_pcs04.pdf, Proc Picture Coding Symposium, Dec. 2004, 6 pages.

Yang, et al., "Adaptive Key Frame Selection Wyner-Ziv Video Coding", 2005 IEEE 7th Workshop on Multimedia Signal Processing, Oct. and Nov. 2005, pp. 4.

Non-Final Office Action for U.S. Appl. No. 11/462,580, mailed on Jun. 21, 2011, Yan Lu, "Wyner-Ziv and Wavelet Video Coding", 18 pgs.

Office Action for U.S. Appl. No. 12/047,317, mailed on Oct. 18, 2011, Yan Lu, "Wyner-Ziv Coding with Multiple Side Information", 9 pgs.

Office Action for U.S. Appl. No. 11/462,580, mailed on Nov. 9, 2011, Yan Lu, "Wyner-Ziv and Wavelet Video Coding ", 13 pgs.

Office Action for U.S. Appl. No. 11/460,217, mailed on Feb. 22, 2012, Yan Lu, "Bitstream Switching in Multiple Bit-Rate Video Streaming Environments", 5 pgs.

* cited by examiner

ENCODING VISUAL DATA WITH COMPUTATION SCHEDULING AND ALLOCATION

BACKGROUND

With rapid increases in network communications bandwidth, real-time visual communication transmissions of video are generally not restricted by bandwidth availability. However, computational costs (i.e., processor workloads) to encode different frames of video content typically vary. That is, as video frame content changes, so does computational requirements to encode the content. For instance, an early termination mechanism adopted in H.264 video encoding motion estimation (ME) operations results in varying computational costs to encode different frames of video data. This is potentially problematic, especially since availability of a processor's limited computational resources generally changes over time. When necessary computational resources are not available, it is often difficult to maintain a consistent frame encoding rate for real-time video transmission. Generally this causes computation overflow, dropped video frames, and the introduction of jitter (transmission delays) into a video stream, resulting in low-quality video playback.

SUMMARY

Computation scheduling and allocation for visual communication is described. In one aspect, multiple frames of video data are encoded by allocating for at least a subset of inter-coded frames, on frame-by-frame basis, computational resources to encode the inter-coded frame. To this end, a computational budget to encode a current inter-coded frame is estimated. The estimate is based on the actual computational costs to encode a previous inter-coded frame of video data. Next, sets of operations associated with encoding the current inter-coded frame are analyzed to determine computational resources to implement the operations. If the computational resources exceed the computational budget, complexity of the operations is reduced until the associated computational resources are less than or equal to the computational budget. At this point, the current inter-coded frame is encoded using the operations and the computational budget. This process is repeated for the remaining inter-coded frames of video data.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Techniques using motion history memory and sorted distortion-computation slopes have been used to estimate and allocate computation resources for video transmission. These techniques, however, are problematic in that they may introduce prohibitive memory demands and computational costs into video encoding and transmission operations. As discussed above, the may result in dropped frames and the introduction of jitter. These techniques are also limited in that they do not produce precise enough results to utilize H.264 fast motion estimation (FME) techniques.

In contrast, systems and methods for computation scheduling and allocation for visual communication, described below in reference to FIGS. 1 through 5, balance computation adaptation with coding efficiency to guarantee that frames of video data are encoded before a certain delay. Since this is performed on a frame-by-frame basis, the systems and methods ensure a consistent encoding rate for real-time video transmission, and thereby, prevent dropped frames and/or introduction of jitter into resulting real-time video transmissions.

An Exemplary System

Although not required, systems and methods for computation scheduling and allocation for visual communication are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
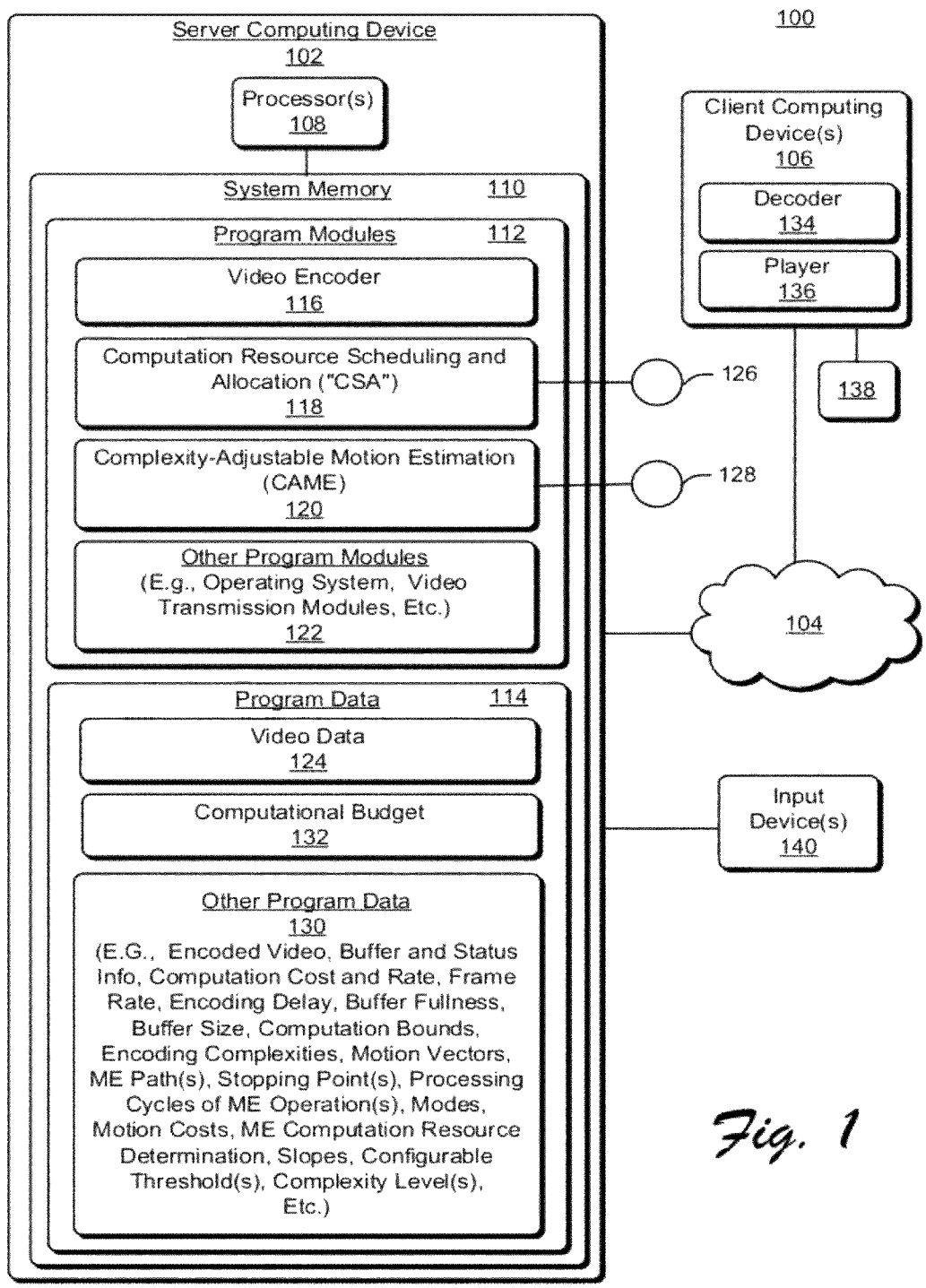
FIG. 1 shows an exemplary system for computation scheduling and allocation for visual communication, according to one embodiment.

FIG. 1 shows an exemplary system 100 for computation scheduling and allocation for visual communication, according to one embodiment. System 100 includes a server computing device ("server") 102 coupled across a network 104 to one or more client computing devices ("client") 106. Server 102 and/or client 106 may be for example a general purpose computing device, a server, a laptop, a mobile computing device, and/or so on. Network 104 may include any combination of a local area network (LAN) and a general wide area network (WAN) communication environments, such as those which are commonplace in offices, enterprise-wide computer networks, intranets, and the Internet. Server 102 and client 106 include one or more respective processors coupled to a system memory comprising computer-program modules and program data. Each respective processor is configured to fetch and execute computer-program instructions from respective ones of the computer-program modules and obtain data from program data.

For example, server 102 includes processor 108 coupled to system memory 110. Processor 108 may be a microprocessor, microcomputer, microcontroller, digital signal processor, etc. System memory 110 includes, for example, volatile random access memory (e.g., RAM) and non-volatile read-only memory (e.g., ROM, flash memory, etc.). System memory 110 comprises program modules 112 and program data 114.

Program modules 112 include, for example, video encoder 116, computation resource scheduling and allocation ("CSA") 118, complexity-adjustable motion estimation (CAME) 120, and "other program modules" 122 such as an Operating System (OS), device drivers, and/or so on.

Video encoder 116 employs operations of CSA 118 and CAME 120 to encode frames of video data 124. In one implementation, for example, CSA 118 and CAME 120 expose respective application programming interfaces (APIs) 126 and 128 to allow video encoder 116 to utilize their respective operations. In another implementation, operations of one or more of CSA 116 and CAME 120 are encapsulated by video encoder 120, independent of one or more exposed APIs. For purposes of exemplary illustration, encoded video data that has been generated by video encoder 116 according to the following described operations is shown as a respective portion of "other program data" 130.

More particularly, for each of at least a subset of frames of video data 124 (i.e., inter-coded frames), video encoder 116 uses CSA 118 to calculate and schedule a computational budget 132 (i.e., $b_{k,alloc}$) to encode the frame. Detailed aspects of CSA 118 are described below in the section titled "Computation Resource Scheduling". In general, however, CSA 118 determines computational budget 132 in view of (a) actual computational cost to encode a previous frame of video data 124; (b) calculated upper and lower computational bounds of processor 108 in view of buffer constraints; and (c) smallest and largest encoding complexities associated with encoding the current frame (i.e., current inter-coded frame) of video data 124. At this point, CAME 120 analyzes ME operations of the current frame to balance motion (RD) and computational costs, and thereby identify an optimal set of ME operations for the frame to at least match computational budget 132. (Detailed aspects of CAME 120 are described below in the section titled "Complexity-Adjustable Motion Estimation").

Video encoder 116 encodes the frame using the identified optimal set of ME operations using the allocated computational budget 132 of processor 108. Server 102 then transmits the encoded video to a remote server 102 for decoding (e.g., using decoder module 134) and playback (e.g., using player module 136), including presentation (e.g., via display device 138), to a user. After a frame is encoded, the encoded frame is ready to be transmitted. The instant of its transmission depends on "other program modules" 122. For purposes of exemplary illustration, such video transmission logic is shown as a respective portion of "other program modules" 122.

In one implementation, CAME 120 directs processor 108 to allocated computational budget 132 to encode the frame. In another implementation, a different module (e.g., CSA 118, etc) directs processor 108 to allocated computational budget 132 to encode the frame.

Computation Resource Scheduling

Figure 2:
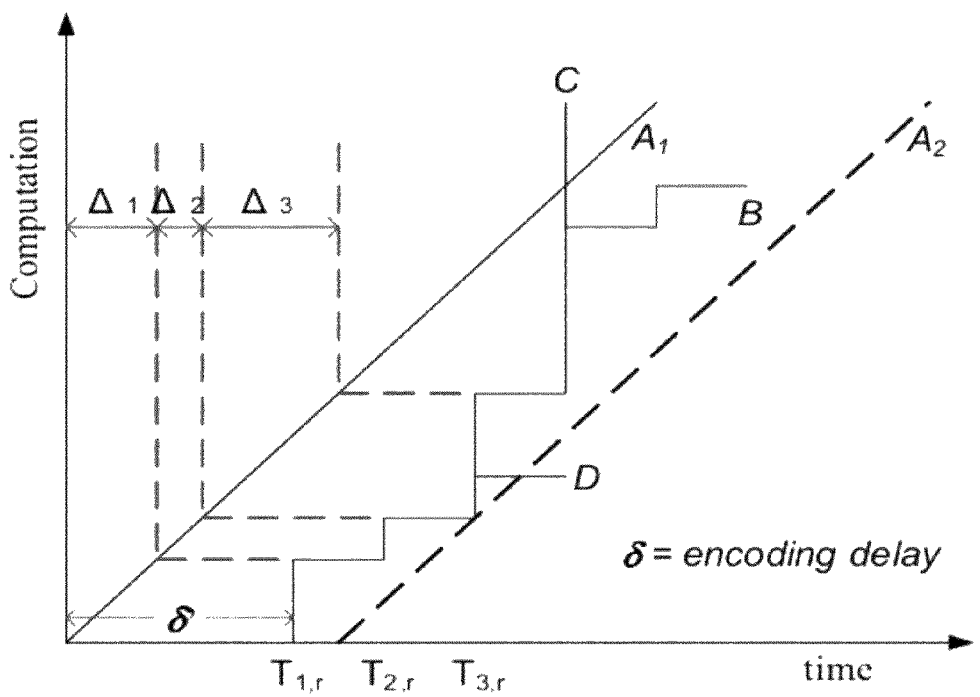
FIG. 2 shows an exemplary illustration of how video encoding computational resource availability over time is related to encoding buffer state.

FIG. 2 shows an exemplary illustration of how video encoding computational resource availability over time may affect encoding buffer state. In this example, A1 and A2 represent upper and lower bounds of an encoding buffer, respectively; Δk represents the encoding time of a $k^{th}$ frame. Referring to FIG. 2, line C, operations to encode any particular frame may become too computationally expensive (i.e., cost too many computation resources, or processor computation cycles), In this scenario, encoding delay may exceed a given maximum delay, resulting in the dropped frames and jitters during video playback operations. Additionally, the encoder may encounter computation underflow. Referring to FIG. 2, line D; if the encoding of a single frame costs too few computation resources, an encoding processor may enter an idle state for an indeterminable amount of time (because an immediately subsequent frame does not arrive), resulting in waste of computation resources.

Video encoder 116 utilizes CSA 118 to balance computation resource adaptation and coding efficiency, thereby providing computation control guaranteeing that each frame of input video data 124 (a video stream) is successfully encoded before a certain delay. That is, CSA 118 maintains actual computation consumption (e.g., between line $A_1$ and line $A_2$ of FIG. 2). This provides a consistent encoding frame rate with no jitter, no buffer overflow (frame dropping), and no buffer underflow.

More particularly, assume $T_{k,a}$, $T_{k,s}$ and $T_{k,e}$ respectively denote time instants that: (1) a $k^{th}$ frame arrives at an encoding buffer; (2) video encoder 116 starts encoding the $k^{th}$ frame; and, (3) video encoder 116 (FIG. 1) ends encoding of the $k^{th}$ frame. An exemplary encoding buffer is shown as a respective portion of other program data 130 as a "computation buffer". $T_{k,r}$ of FIG. 2 denotes a time when the $k^{th}$ frame is removed by video encoder 116 from the computation buffer. Suppose computation cost of encoding the $k^{th}$ frame is $b_k$, size of the computation buffer is B, and fullness of the computation buffer when the $k^{th}$ frame arrives is $B_k$. Suppose the computation rate is $C_r$, and frame encoding delay is a constant δ. Thus, the time when the $k^{th}$ frame is removed by video encoder 116 from the computation buffer is: $T_{k,r}=T_{k,a}+δ$. Suppose the rate at which frames of video data 124 arrive at the computation buffer (i.e., frame rate) is M frames per second. The time instant a $k^{th}$ frame arrives at the computation buffer is: $T_{k,a}=(k-1)/M$. CSA 118 guarantees the time when the $k^{th}$ frame is removed by video encoder 116 from the computation buffer is greater than or equal to the time when video encoder 116 (FIG. 1) ends encoding of the $k^{th}$ frame (i.e., $T_{k,r} \geq T_{k,e}$) to avoid overflow (overload) of computational cost.

Since the time when video encoder 116 starts encoding a $k^{th}$ frame ($T_{k,s}$) is equal to the time when the $k^{th}$ frame arrives at an encoding buffer ($T_{k,a}$), plus an indication of fullness of the computation buffer when the $k^{th}$ frame arrives (i.e., $B_k$), divided by the computation rate ($C_r$) (i.e., $T_{k,s}=T_{k,a}+B_k/C_r$), then $T_{k,a}+δ \geq T_{k,s}+b_k/C_r$. Supposing the frame encoding delay $δ=B/C_r$, we get $b_k \leq B-B_k$. (i.e., computation cost of encoding the $k^{th}$ frame is less than or equal to the size (B) of the computation buffer minus fullness ($B_k$) of the computation buffer when the $k^{th}$ frame arrives). Thus, the upper computation bound (upper bound of processor workload) for a current frame is $U_k=B-B_k$. Additionally, CSA 118 guarantees $b_k+B_k \geq C_r/M$ so as to avoid underflow of computational cost. Accordingly, the lower computation bound (lower bound of processor workload) for the current frame k is $L_k=\max\{0, C_r/M-B_k\}$. With the upper and lower bounds representing respective states of the computation buffer ("buffer states"), CSA 118 schedules for allocation of computation resources of processor 108 to encode a current frame of video data 124.

CSA 118 determines the number of overall processing cycles to a current frame, not the number of processing cycles to perform a task such ME. (A certain number of processing cycles to a specific task such as ME is determined, for example, with CAME 120). To this end, CSA 118 estimates computational cost of the current frame $b_{k,est}$ based on the actual computational cost of encoding a previous frame of video data 124 and estimated task complexities of encoding a previous frame of video data. In this implementation, the previous frame is an immediately previous frame. In another implementation, the previous frame is the immediately previous frame or a frame prior to the immediately previous frame. CSA 118 then calculates a computational budget 132 ($b_{k,alloc}$) according to computation bound statuses of the computation (encoding) buffer and encoding complexities of the current frame. This is accomplished as follows:

$$b_{k,alloc} = \begin{cases} \max(C_{low}, L_k) & b_{k,est} \leq \max(C_{low}, L_k) \\ \min(C_{high}, U_k) & b_{k,est} \geq \min(C_{high}, U_k), \\ b_{k,est} & \text{else} \end{cases} \quad (1)$$

wherein $C_{low}$ and $C_{high}$ denote lowest and highest encoding complexities of the current frame $C_{low}$ and $C_{high}$ are calculated from several first training frames and are updated in the following encoding process. $C_{low}$ and $C_{high}$ also provide means for a user to customize encoder 116 operations. For example, during the encoding process, the user can dynamically set $C_{high}$ a smaller value (e.g. 50% of the previous value) when a new application process is inserted. In one implementation, $C_{high}$ and $C_{low}$ are indicated by the computation resources that encoder 116 will utilize to encode a current frame with the simplest and most complicated configuration parameters, respectively. Exemplary such configuration parameters include, for example rate-distortion optimization, full search motion estimation, etc.

After a current frame of video data 124 has been encoded, CSA 118 (or a different module) updates state (buffer computational statuses) of the computation buffer to reflect the actual computational cost to encode of the current frame.

Complexity-Adjustable Motion Estimation (CAME)

In real-time video communication systems there is a high computational cost of full search motion estimation operations. Such costs are based on encoding rates and distortion. To address this, CAME 120 analyzes ME path costs. This analysis provides an objective determination of whether select one of ME operations and associated operational paths of the current frame are compatible with the computational budget 132 ($b_{k,alloc}$). In this implementation, operations of CAME 120 are performed done after the determination of computation budget 132 of a current frame. After the encoding of the current frame, parameters related to CAME 120 will be updated for the encoding of a following frame.

In general, a fast motion estimation algorithm: (1) checks motion vector predictors using both spatial and temporal correlations to determine an initial searching point; (2) evaluates candidate points around the initial searching point using searching patterns to obtain motion vector(s); and (3) locally searches around the obtained motion vectors using a small search pattern to refine the motion vector(s). Exemplary motion vector predictors include, for example, the median prediction, the (0, 0) vector and the motion vectors of the neighboring left, top, and top-right blocks. A "searching point" is a location of a candidate predicting block in the reference frame.

Of steps (1)-(3), step (2) utilizes the majority of processor 108 computational resources. This is because step (2) evaluates candidate-searching points. Step (1) may identify very good motion vector(s), and if so, the second step (2) could be skipped. However, step (2) is still efficient to identify motion vector(s) for video sequences with complex motions and textures. In this implementation, CAME 120 determines whether use of a particular step (e.g., step (2)) will provide gain (i.e., not overflow computational resources) during frame encoding operations. If such objectively determined gain is evident, CAME 120 will implement the particular set of operations. Otherwise, CAME 120 will skip the particular step. To this end, and in this implementation, CAME 120 separates fast ME operations from slower ME operations implemented by video encoder 116 into multiple ME operational paths (e.g., two paths), as shown for example in FIG. 3. In another implementation, CAME 120 separates (segments) fast motion estimation operations implemented by video encoder 116 into more than two paths based on the particular encoding algorithm being employed.

Figure 3:
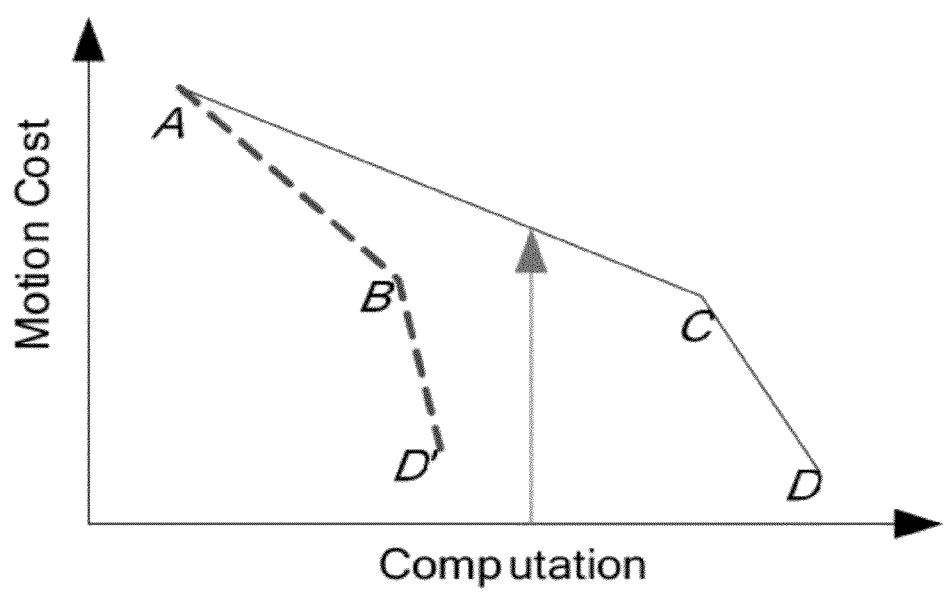
FIG. 3 shows an exemplary set of relations between motion cost and computational cost of different motion estimation operations, according to one implementation.

FIG. 3 shows an exemplary set of relations between motion cost and computational cost of two different motion estimation operational paths, according to one implementation. As shown in the example of FIG. 3, and TABLE 1 below, each motion path includes multiple ME operations. Motion costs represent evaluated coding costs of a frame of video data 124 with respect to encoding rate and distortion (RD) during select ME operations. A smaller motion cost indicates better rate-distortion performance, that is to say, using fewer bits at the same visual quality. Exemplary ME operations A, B, C, D and D' of FIG. 3 are described below in TABLE 1.

TABLE 1

| Exemplary Motion Estimation Operations | |
|---|---|
| A | Without motion search (e.g., by setting motion vector as zero) |
| B | Reduced Integer pixel ME (step 1 skipped) |
| C | Integer pixel ME |
| D | Integer ME + sub pixel ME |
| D' | Reduced Integer pixel ME + sub pixel ME |

The ME search operations illustrated if FIG. 1 and TABLE 1 are applicable to H.264 based video encoders 116 as well as to video encoders 116 based on other encoding standards. However, computation costs (as shown in the example of FIG. 3) for a non-H.264 encoder in terms of A, B, C, D and D' are different from computational costs for these operations in an H.264 encoder. Thus, although exemplary ME operations A, B, C, D and D', are discussed, it can be appreciated that a particular architecture may implement all or a subset of the ME operations of TABLE 1, and/or different ME operations. Thus, the ME scheme actually adopted by video encoder 116 is arbitrary, and the operations of TABLE 1 are shown for purpose of exemplary description and illustration.

FIG. 3 shows that the ME operations associated with path A-B-D' please also see TABLE 1) require less computation (processor 108 workload) than counterpart ME operations associated with exemplary ME operational path A-C-D. To address this, CAME 120 implements a frame-level CAME algorithm to select a ME operational path and termination point under given computational conditions. CAME 120 ensures that macroblocks within a frame of video data 124 have the same ME path and stopping point. Providing a basis, a typical objective motion cost function to select a best ME search path and stopping point is shown in equation (3).

$$J_{motion}(m, c) = \min_{MV_i \in \Omega(c)} \{SAD(MV_i, m) + \lambda R(MV_i, m)\}, \quad (2)$$

wherein $\Omega(c)$ is the set of candidate motion vectors of a frame of video data 124 for mode m under a restriction of available complexity level C. Complexity level c is determined by CSA 118, which corresponds to the number of processing cycles at a stopping point X in TABLE 1, as determined by CAME 120. In one implementation, CSA 118 determines the allocated computational budget (i.e. the number of processing cycles), and accordingly, a stopping point X in TABLE 1 is determined, whose corresponding number of processing cycles is the closest to the allocated computational budget. Then, Ω(c) is determined according to the selected stopping point X. (Note that c is an intermediate variable that is used to determine Ω(c).) SAD is an acronym representing "sum of absolute difference", and the lambda symbol represents a Lagrange multiplier. In one implementation, the complexity level c is determined by matching the number of actually allocated processing cycles ($b_{k,alloc}$) with the number of processing cycles corresponding to each stopping point in TABLE 1 to find the closest one. The number of processing cycles corresponding to each stopping point in TABLE 1 is determined by pre-defined ME operations (e.g., the operations shown in TABLE 1, or other operations). Based on Eq. (2), Ω(c) provides a most suitable motion vector corresponding to $J_{motion}(m, c)$, i.e. the minimum motion cost under complexity level c.

The following equation can be used to select a best mode:

$$J(c) = \min_{m \in M} \{J_{motion}(m, c)\}, \quad (3)$$

wherein M is the set of candidate modes. That is to say, by going through all candidate modes in M, a most suitable encoding mode can be found corresponding to J(c), i.e. the minimum motion cost under complexity level c. For example, in one implementation video encoder 116 utilizes H.264 modes, wherein candidate modes include INTRA, SKIP, INTER_16×16, INTER_8×8, etc. In another implementation, different candidate modes are utilized.

CAME 120 provides complexity level c for use equations (1) and (2), defines Ω(c)—a set of candidate motion vectors, and selects a best ME search path in terms of these motion vectors. CAME 120 implements path selection criterion based, for example, on the following ratio:

$$\frac{J_i(B) - J_i(C)}{J_i(B)}, \quad (3)$$

In general, $J_i(X)$ represents an overall computation cost of encoding an $i^{th}$ frame with the operations indicated by stopping point X, wherein this example, X belongs to {A, B, C, D, D'}. In one example, using equation (3), if the indicated ratio is less than a configurable threshold, path A-B-D' can get almost the same rate-distortion (R-D) performance as path A-C-D, but with less computational cost. Such a threshold is pre-defined and can be configured to tune the results to the data. Typically, a threshold (e.g., theta, phi, etc.) is defined to be the one that results in the best rate-distortion performance under a desired processor workload level. In one implementation, for example, the configurable threshold is 0.02, although it could be other values based on desired RD performance. Within a selected path, a similar selection algorithm can be used to identify a ME path stopping point.

For example, in the above described path selection process, $J_i(B)$ and $J_i(C)$ are used to select a certain path of A-B-D' or A-C-D. To further select a stopping point at the selected path, for example, when the path of A-B-b' is selected, we can use $J_i(B)$ and $J_i(D')$ to select the stopping point to be either B or D' with a second pre-defined threshold. In this implementation, for example, the second threshold is 0.01, although it could be a different value to tune the results to the data being encoded.

Since ME cost at each step prior to coding of a current frame of video data 124 is not available, CAME 120 employs actual cost of a previously coded frame of video data 124 to estimate ME cost of the current frame of video data 124. The estimate is denoted as $J_{i,p}(X)$, wherein "X" represent a specific searching point, or ME operation. This process is called forward path selection. In the forward path selection. In this implementation, and to guarantee that there is minimal performance loss, CAME 120 assumes computation budget 132 (determined by CSA 118) is enough to encode the current frame. CAME 120 determines whether computation budget 132 is enough by comparing it with the motion cost associated with various ME paths and stopping points in forward path selection operations. TABLE 2 shows exemplary forward path selection operations that are implemented independent of computational cost of operations associated with an ME path, according to one embodiment.

TABLE 2

EXEMPLARY FORWARD PATH SELECTION OPERATIONS if ( ($J_{i,p}(B) - J_{i,p}(C)$) / $J_{i,p}(B)$ < θ)
// B and C represent different exemplary candidate paths to be selected.
// Actual computation costs of ME operations for the candidate paths are
// evaluated for previous frame in view of threshold theta. When smaller
// than theta, path A-B has similar rate-distortion performance but less
// computation cost than A-C. (Note that A-B and A-B-D' indicate the
// same ME path but different stopping points)
    if ( ($J_{i,p}(B) - J_{i,p}(D')$) / $J_{i,p}(B)$ < φ)
// B and D' represent two different stopping points in the path A-B-D'.
// Evaluate actual computation costs of ME operations (B and D') for
// previous frame in view of threshold phi
        path = A-B
    else
        path = A-B-D'
else
    if ( ($J_{i,p}(C) - J_{i,p}(D)$) / $J_{i,p}(C)$ < φ)
        path = A-C
    else
        path = A-C-D If CAME 120 determines that computation budget 132 ($b_{k,alloc}$) is not enough to encode the current frame k, CAME 120 adjusts the operations of selected ones of the ME operational paths by calculating slopes of ME operational paths to trace backward to a certain point to meet computation budget 132. In this process, a path with smaller slope indicates more coding gain per computation. Therefore CAME 120 selects a path with a smaller slope as compared to slope(s) of other path(s). Referring to the example of FIG. 3, please note that the slope of path A-B is not always larger than that of path A-C. The above process is called the backward path selection. TABLE 3 shows exemplary backward path selection operations to refine computational cost of ME path operations, according to one embodiment.

TABLE 3

EXEMPLARY BACKWARD PATH SELECTION OPERATIONS

If (computation unavailable)
    Switch (path)
        case A-B-D':
            path = A-B
        case A-C:
        if (D' available)     path = A-B-D'
        else     path = A-B
        case A-C-D:
        if (C available)
            if (D' available && slopA-D' >slopA-C)
                path = A-B-D'
            else     path = A-C TABLE 3-continued

EXEMPLARY BACKWARD PATH SELECTION OPERATIONS else // C unavailable
go to case A-C Again, CAME 120 implements "forward path selection" operations first to select a ME path and stopping point, independent of available computation resources. After this resource independent ME path and stopping point have been determined, ME path computation resources to implement the path are identified. For purposes of exemplary illustration, such E path computation resources are shown as a respective portion of "other program data" 130. If the determined ME path computation resources are greater than computational budget 132, CAME 120 performs the backward path selection operations (e.g., TABLE 2) to change the selected ME path and the stopping point. This process is iteratively performed until a selected ME path and stopping point are determined to use less than or equal amounts of computational resources as computational budget 132.

At this point, CAME 120 allocates computational budget 132 to encode a current frame of video data 124. Techniques to direct a processor to allocate a certain number of processing cycles to execute a set of operations are known. For example, in one implementation, CAME 120 sets a register used by processor 108 to indicate the number of processing cycles to allocate to encode a current frame of video data 124. Video encoder 116 encodes the frame to generate encoded video data for transmission to client computing device 106.

Exemplary Architecture for a Video Encoder

Figure 4:
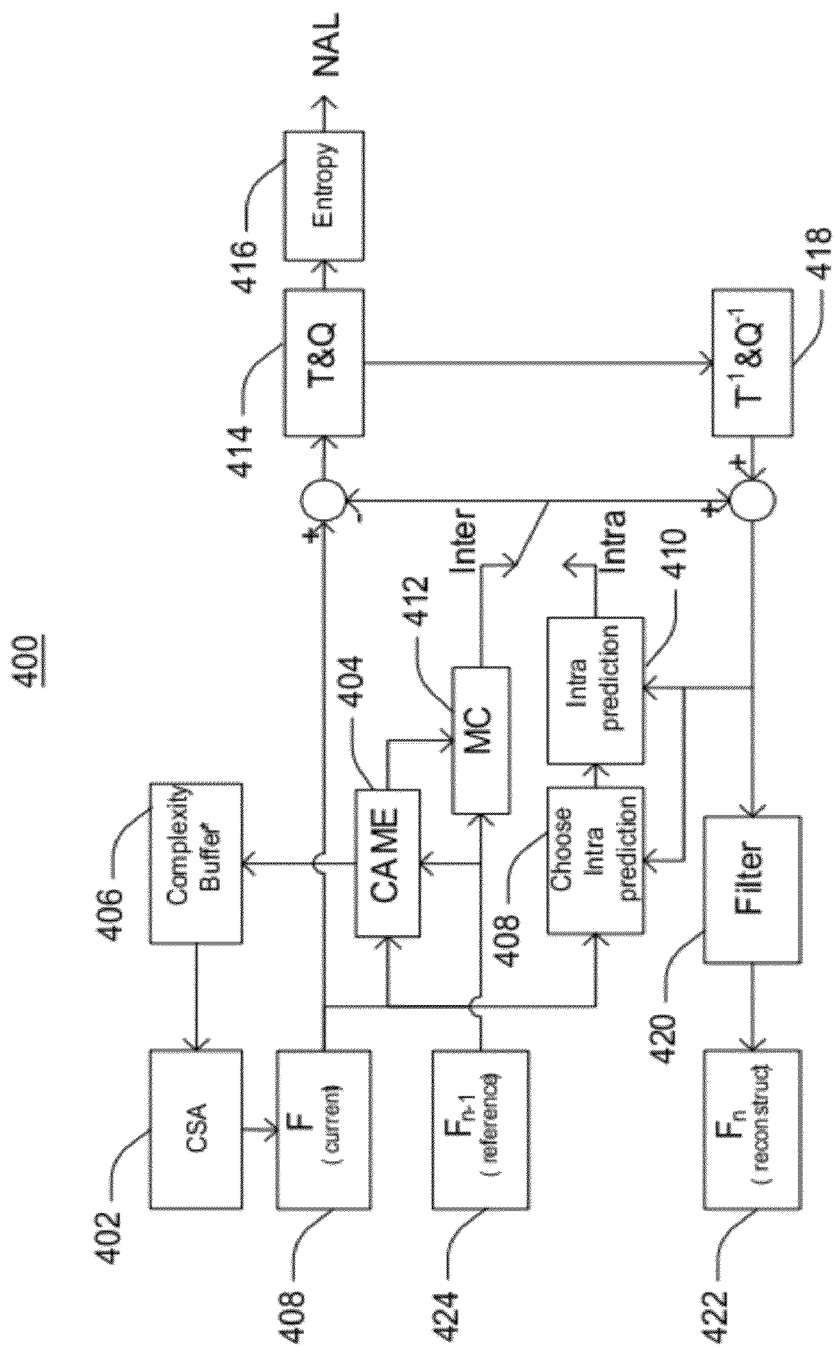
FIG. 4 shows an exemplary implementation of a video encoder that utilizes computation scheduling and allocation for real-time visual communication, according to one embodiment.

FIG. 4 shows an exemplary illustration for computation scheduling and allocation for real-time visual communication, according to one embodiment. In this implementation, the computation scheduling and allocation are directed to H.264 based encoding operations, although it can be appreciated that other encoding standards could be used in view of the described computational scheduling and allocation components and operations. For purposes of exemplary description, aspects of FIG. 4 are described with respect to the components of FIG. 1.

Referring to FIG. 4, CSA component 402 implements operations of CSA 118 of FIG. 1 to schedule computational budget 132 to encode a current frame of video data 124, as described above with respect to FIG. 1. Component 404 implements operations of CAME 120 as described above with respect to FIG. 1 to identify a select set of motion vectors (a path) between a current frame F 404 and a reference frame $F_{n-1}'$ 424 of video data 124 (FIG. 1) that meet computational budget 132. Remaining blocks 406 through 424 of FIG. 4 represent conventional video encoding operations implemented by video encoder 116 of FIG. 1.

An Exemplary Procedure

Figure 5:
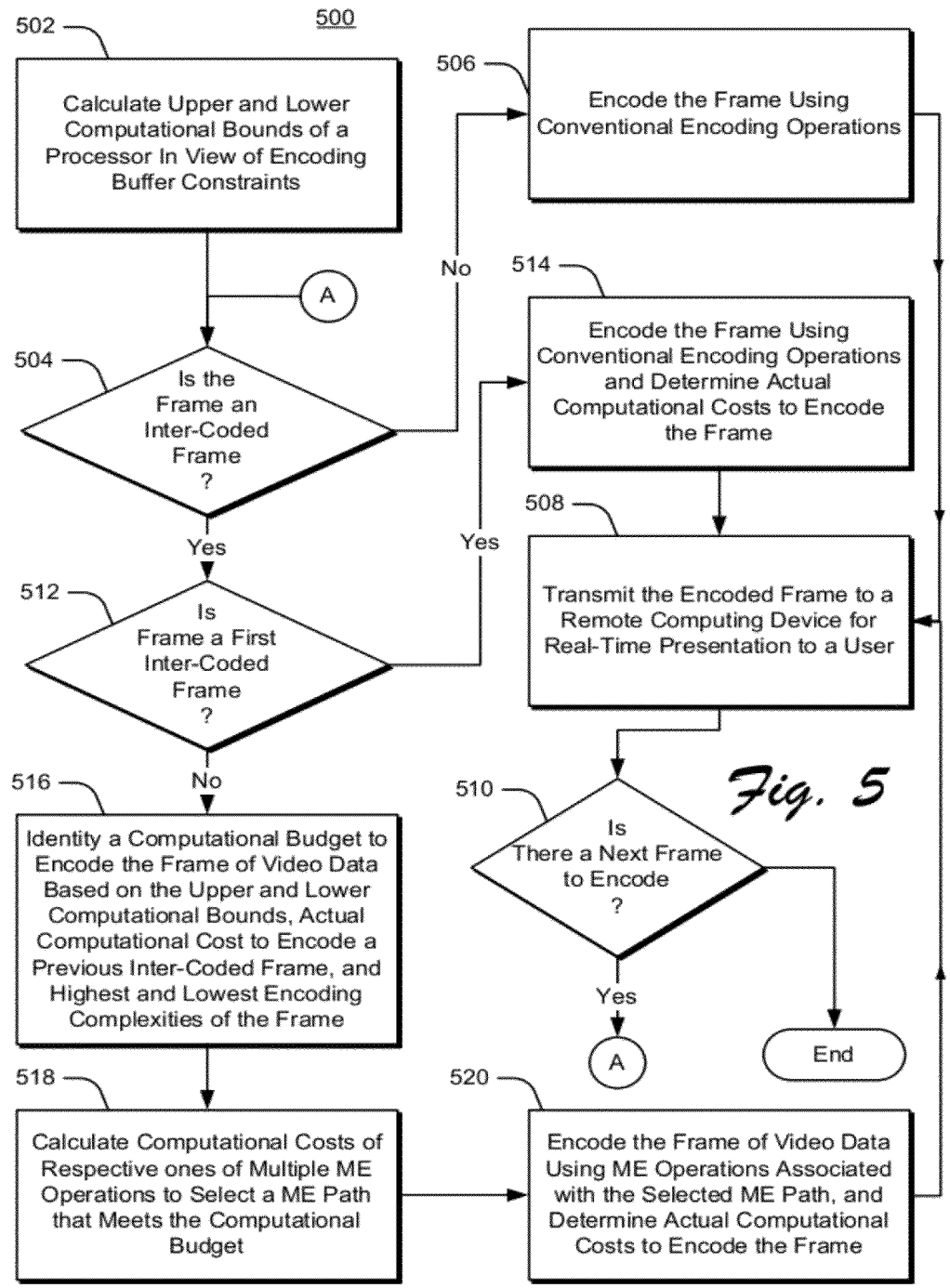
FIG. 5 shows an exemplary procedure for computation scheduling and allocation for real-time visual communication, according to one embodiment.

FIG. 5 shows an exemplary procedure 500 for computation scheduling and allocation for visual communication, according to one embodiment. For purposes of exemplary illustration and description, the operations of procedure 500 are described with respect to components of FIG. 1. In the following description of FIG. 5, each first numeral of a reference number indicates a drawing where the component associated with the reference number was first identified.

At block 502, video encoder 116 (or CSA 118) calculates upper and lower computational bounds of processor 108. In one implementation, these computational bounds are determined in view of encoding buffer constraints such as size of the computation buffer, fullness of the computation buffer when a current frame arrives, computation rate, frame encoding delay, time when the frame is removed by encoder for encoding, and/or so on. At block 504, video encoder 116 determines whether the current frame of video data 124 is an inter-coded frame of video data 124. If not, operations continue at block 506, where the frame is encoded using conventional frame encoding operations. At this point, the procedure continues at block 508, wherein the encoded frame is communicated to a remote computing device 106 for real-time presentation to a user. At block 510, video encoder 116 determines if there is a next frame of video data 124 to encode. If so, operations continue at on-page reference "A" and block 504, as discussed above for non-inter-coded frames and below for inter-coded frames.

Referring again to block 504, if the current frame of video data 124 is an inter-coded frame, operations continue at block 512, wherein the procedure determines if the frame is a first interceded frame encountered in this encoding operation. If so, operations continue at block 514, where the frame is encoded using conventional frame encoding operations, and actual computational cost to encode the inter-coded frame is determined. Techniques to determine computational costs of a set of operations are known. In one implementation, this and other computational costs are stored as statuses of an encoding or computational buffer. At this point, operations continue at block 508, as discussed above.

Referring again to block 512, if the current frame of video data 124 is not the first interceded frame encountered in this encoding operation, operations continue at block 516. At block 516, video encoder 116 leverages operations of CSA 118 to determine and schedules computational budget 132 (FIG. 1) to encode the current frame of video data. This computational budget is based at least on actual computational costs to encode a previous frame of video data. More particularly, the computational budget is calculated based on an evaluation of complexity levels associated with coding the current frame, upper and lower computational balance of the processor that is being used to encode the current frame, and the actual computational cost of encoding a previous inter-coded frame.

At block 518, video encoder 116 uses CAME 120 to calculate computational costs of respective ones of multiple motion estimation operations associated with the current frame of video data 124. CAME 120 utilizes these computational costs to adjust encoding complexity of to include at least a subset of these operations so that they conform to the computational budget 132 (the computational budget was generated at block 516). At block 520, video encoder 116 encodes the current frame of video data using the selected motion estimation operations and the computational budget, and calculated the actual computational cost to encode the current frame of video data. Operations of procedure 500 continue at block 508, as discussed above.

Conclusion

Although systems and methods for computation scheduling and allocation for visual communication have been described in language specific to structural features and/or methodological operations or actions, it is understood that the implementations defined in the appended claims are not necessarily limited to the specific features or actions described above. Rather, the described features are disclosed as exemplary forms of implementing the claimed subject matter.

The invention claimed is:

1. A computer-implemented method for encoding multiple frames of video data, the method comprising:

for each of at least a subset of inter-coded frames of the multiple frames:

adapting complexity of operations to encode an inter-coded frame of the subset of inter-coded frames to a computational budget scheduled to ensure that the inter-coded frame is encoded before a certain delay targeted to process the inter-coded frame between upper and lower computational bounds of a processor, the upper and lower computational bounds being calculated by the processor based on fullness of computation buffer when the inter-coded frame arrives at an encoding buffer, the computational budget being determined based on actual computational resources used to encode a previous inter-coded frame;

encoding the inter-coded frame using the computational budget to generate a frame of encoded video data for subsequent transmission and presentation to a user;

identifying a plurality of motion estimation (ME) operations to encode the inter-coded frame;

segmenting the plurality of ME operations into at least two ME paths by separating fast ME operations of the plurality of ME operations from other ME operations of the plurality of ME operations; and selecting from the at least two ME paths a particular ME path comprising at least a subset of the plurality of ME operations to encode the inter-coded frame, the at least a subset being selected such that a computational cost of implementing the at least a subset is not greater than the computational budget.

2. The method of claim 1, wherein the upper and lower computational bounds are further calculated based on a time that a frame of video data is stored into a buffer, times when a video encoder respectively begins and ends encoding the frame, a rate at which frames are stored in the buffer, a time when the video encoder removes the frame from the buffer, size of the buffer, encoding computation rate, and frame encoding delay.

3. The method of claim 1, wherein the subsequent transmission is real-time video transmission to a remote computing device.

4. The method of claim 1, wherein the adapting complexity comprises:

determining the computational budget in view of one or more of (a) the upper and lower computational bounds and (b) upper and lower encoding complexities of the frame; and configuring computational costs of motion estimation operations of the inter-coded frame to be less than or equal to the computational budget.

5. The method of claim 1, wherein the adapting complexity comprises:

(a) if actual computational resources used to encode a previous inter-coded frame are less than or equal to a maximum one of a low encoding complexity to encode the inter-coded frame and the lower computational bound, identifying that the computation budget is the maximum one;

(b) if actual computational resources used to encode the previous inter-coded frame are greater than or equal to a minimum one of a high encoding complexity to encode the inter-coded frame and the upper computational bound, identifying that the computation budget is the minimum one; and (c) if not (a) and not (b), setting the computation budget to the actual computational resources used to encode the previous inter-coded frame.

6. The method of claim 1, wherein the balancing motion costs and computational costs comprises:

if computational costs of implementing the particular ME path are greater than the computational budget, determining ME path slopes associated with the at least a subset; and removing, based on the ME path slopes, certain ones of the ME operations from the at least a subset until the computational costs are less than or equal to the computational budget.

7. The method claim 1, further comprising:

selecting an encoding mode based on a minimum motion cost of the frame in view of a complexity level of the inter-coded frame, the encoding the inter-coded frame utilizing the encoding mode to encode the inter-coded frame.

8. A system memory comprising instructions stored that, when executed by one or more processors, direct one or more computers to perform operations including:

for each of at least a subset of inter-coded frames of multiple frames:

adapting complexity of operations to encode one inter-coded frame of the subset of inter-coded frames to a computational budget scheduled to ensure that the inter-coded frame is encoded before a certain delay targeted to process the inter-coded frame between upper and lower computational bounds of a processor, the computational budget being determined based on actual computational resources used to encode a previous inter-coded frame;

encoding the inter-coded frame using the computational budget to generate a frame of encoded video data for subsequent transmission and presentation to a user;

identifying a plurality of motion estimation (ME) operations to encode the inter-coded frame;

segmenting the plurality of ME operations into at least two ME paths by separating fast ME operations of the plurality of ME operations from other ME operations of the plurality of ME operations; and selecting, from the at least two ME paths, a particular ME path comprising at least a subset of the plurality of ME operations to encode the inter-coded frame, the at least a subset being selected such that a computational cost of implementing the at least a subset is not greater than the computational budget.

9. The system memory of claim 8, wherein the upper and lower computational bounds are determined in view of a time that a frame of video data is stored into a buffer, fullness of the buffer at the time, times when a video encoder respectively begins and ends encoding the frame, a rate at which frames are stored in the buffer, a time when the video encoder removes the frame from the buffer, size of the buffer, encoding computation rate, and frame encoding delay.

10. The system memory of claim 8, wherein the subsequent transmission is real-time video transmission to a remote computing device.

11. The system memory of claim 8, wherein the computational budget is further determined in view of one or more of the upper and lower computational bounds, and upper and lower encoding complexities of the frame.

12. The system memory of claim 8, wherein the adapting complexity comprise: configuring computational costs of motion estimation operations of the inter-coded frame to be less than or equal to the computational budget.

13. The system memory of claim 8, wherein the balancing motion costs and computational costs comprises:

if computational costs of implementing the particular ME path are greater than the computational budget, determining ME path slopes associated with the at least a subset; and removing, based on the ME path slopes, certain ones of the ME operations from the at least a subset until the computational costs are less than or equal to the computational budget.

14. A computing device for encoding multiple frames of video data, the computer device comprising:

a processor; and a memory couple to the processor, the memory comprising computer-program instructions executable by the processor for performing operations comprising:

for each of at least a subset of inter-coded frames of the multiple frames:

adapting complexity of operations to encode one inter-coded frame of the subset of inter-coded frames to a computational budget scheduled to ensure that the inter-coded frame is encoded before a certain delay targeted to process the inter-coded frame between upper and lower computational bounds of the processor, the upper and lower computational bounds being calculated based on fullness of the computation buffer when the inter coded frame arrives at an encoding buffer, the computational budget being determined based on actual computational resources used to encode a previous inter-coded frame, encoding the inter-coded frames using the computational budget to generate a frame of encoded video data for subsequent transmission and presentation to a user, identifying a plurality of motion estimation (ME) operations to encode the inter-coded frame, segmenting the plurality of ME operations into at least two ME paths by separating fast ME operations of the plurality of ME operations from other ME operations of the plurality of ME operations, and selecting, from the two ME paths, a particular ME path comprising at least a subset of the plurality of ME operations to encode the inter-coded frame, the at least a subset being selected such that a computational cost of implementing the at least a subset is not greater than the computational budget.

15. The computing device of claim 14, wherein the upper and lower computation bounds are further calculated based on a time that a frame of video data is stored into a buffer, times when a video encoder respectively begins and ends encoding the frame, a rate at which frames are stored in the buffer, a time when the video encoder removes the frame from the buffer, size of the buffer, encoding computation rate, and frame encoding delay;

wherein the adapting complexity comprises:

determining the computational budget in view of one or more of (a) the upper and lower computational bounds and (b) upper and lower encoding complexities of the frame, and configuring computational costs of motion estimation operations of the inter-coded frame to be less than or equal to the computational budget.

16. The computing device of claim 14, wherein the adapting complexity comprises:

(a) if actual computational resources used to encode a previous inter-coded frame are less than or equal to a maximum one of a low encoding complexity to encode the inter-coded frame and the lower computational bound, identifying that the computation budget is the maximum one;

(b) if actual computational resources used to encode the previous inter-coded frame are greater than or equal to a minimum one of a high encoding complexity to encode the inter-coded frame and the upper computational bound, identifying that the computation budget is the minimum one; and (c) if not (a) and not (b), setting the computation budget to the actual computational resources used to encode the previous inter-coded frame.

17. The computing device of claim 14, wherein the operations further comprise:

selecting an encoding mode based on a minimum motion cost of the frame in view of a complexity level of the inter-coded frame; and wherein the encoding the inter-coded frame utilizes the encoding mode to encode the inter-coded frame.

* * * * *